United States Patent [19]

Freund et al.

[11] Patent Number: 5,024,528
[45] Date of Patent: Jun. 18, 1991

[54] ALIGNMENT APPARATUS EMPLOYING A LASER LIGHT SCATTERER

[75] Inventors: Isaac Freund, Petach Tikva; Michael Rosenbluh, Givat Shumel, both of Israel

[73] Assignee: Bar Ilan University, Israel, Israel

[21] Appl. No.: 435,019

[22] Filed: Nov. 13, 1989

[51] Int. Cl.[5] .............................................. G01B 9/02
[52] U.S. Cl. .................................... 356/356; 356/363
[58] Field of Search ................ 356/345, 354, 356, 363

[56] References Cited

PUBLICATIONS

"Basic Physical Principles of Defocused Speckle Photography; a Tilt Topology Inspection Technique", Gregory, Opitcs & Laser Tech., 10-1976, pp. 201-213.
Freund, I. et al., "Momory Effects in Propagation of Optical Waves Through Disordered Media", Physical Rev. Letters, vol. 61, 20, 1988, pp. 2328-2331.

Primary Examiner—Samuel Turner
Attorney, Agent, or Firm—Nixon & Vanderhye

[57] ABSTRACT

Alignment apparatus including a source of coherent radiation mounted in a reference location and arranged to provide an output beam extending along a reference axis, a laser light reflector mounted at a location sought to be aligned with respect to the reference location and/or the reference axis, a laser light scatterer arranged to receive reflected laser light from the reflector and to produce a speckle pattern and a detector arranged to sense the speckle pattern produced by the laser light scatterer in response to incident reflected laser light, whereby variations in the speckle pattern indicate changes in relative orientation between the reference location and the laser light reflector.

28 Claims, 3 Drawing Sheets

ALIGNMENT APPARATUS EMPLOYING A LASER LIGHT SCATTERER

FIELD OF THE INVENTION

The present invention relates to apparatus and techniques for alignment, such as boresighting.

BACKGROUND OF THE INVENTION

Various apparatus and techniques exist for boresighting. Generally speaking, relatively costly optical devices are used for this purpose.

Many of the existing optical devices are unsuitable for use in the field, which is typically a dusty and high-vibration environment. The existing optical devices have costly precision optical parts which often must be realigned in the field. This is often time-consuming and difficult and the resultant accuracy is not as precise as is desired. Additionally, the realignment typically cannot be done in real-time.

SUMMARY OF THE INVENTION

The present invention seeks to provide boresighting apparatus which is highly accurate, rugged, easy to use and of relatively low cost.

There is thus provided in accordance with a preferred embodiment of the present invention alignment apparatus including a source of coherent radiation mounted in a reference location and arranged to provide an output beam extending along a reference axis, a laser light reflector mounted at a location sought to be aligned with respect to the reference location and/or the reference axis, a laser light scatterer arranged to receive reflected laser light from the reflector and to produce a speckle pattern and a detector arranged to sense the speckle pattern produced by the laser light scatterer in response to incident reflected laser light, whereby variations in the speckle pattern indicate changes in relative orientation between the reference location and the laser light reflector.

In accordance with a preferred embodiment of the present invention, the laser light source, the laser light scatterer and the detector are fixedly mounted with respect to each other and with respect to the reference location.

Additionally, in accordance with a preferred embodiment of the present invention, the apparatus also comprises a digitizer and digital memory means for storing a reference speckle pattern.

Moreover, in accordance with a preferred embodiment of the present invention, the apparatus additionally comprises apparatus for comparing a reference speckle pattern with subsequently acquired speckle patterns for determining alignment.

Further, in accordance with a preferred embodiment of the present invention, the apparatus additionally comprises apparatus for providing positioning of the location sought to be aligned in response to variations in the sensed speckle pattern.

In accordance with a preferred embodiment of the present invention, there is provided an alignment technique comprising the steps of providing a source of coherent radiation mounted at a reference location to produce an output beam extending along a reference axis, of providing a laser light reflector mounted at a location sought to be aligned with respect to at least one of the reference location and the reference axis, of providing a laser light scatterer and arranging it to receive reflected laser light from the reflector and to produce a speckle pattern and of detecting the speckle pattern produced by the laser light scatterer in response to incident reflected laser light, whereby variations in the speckle pattern indicate changes in relative orientation between the reference location and the laser light reflector.

Additionally, in accordance with a preferred embodiment of the present invention, the technique additionally comprises the steps of digitizing a reference speckle pattern and storing it in a digital memory.

Moreover, in accordance with a preferred embodiment of the present invention, the technique comprises the step of comparing a reference speckle pattern with subsequently acquired speckle patterns for determining alignment. The step of comparing includes the step of two-dimensionally cross-correlating said reference speckle pattern with at least one subsequently acquired speckle pattern.

Finally, in accordance with a preferred embodiment of the present invention, the technique comprises the step of providing positioning of the location sought to be aligned in response to variations in the sensed speckle pattern.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
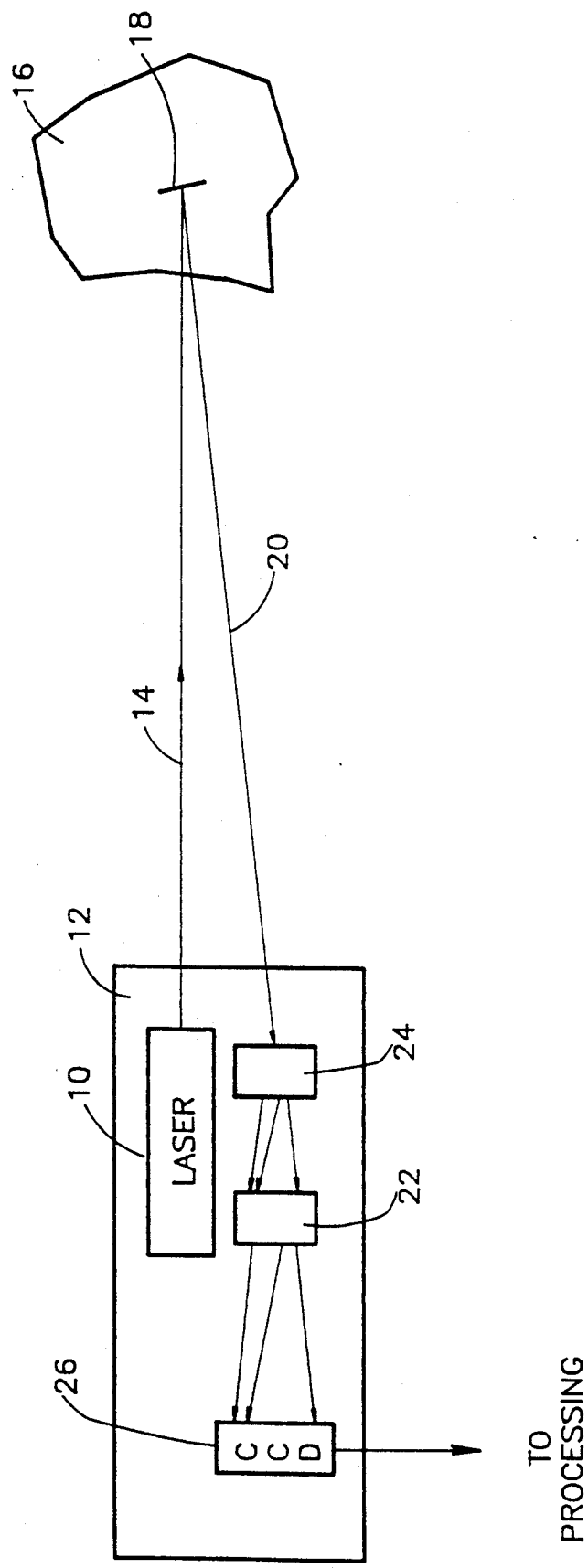
FIG. 1 is a simplified optical illustration of the optical arrangement of alignment apparatus constructed and operative in accordance with a preferred embodiment of the present invention.

Reference is now made to FIG. 1, which illustrates apparatus for optical alignment constructed and operative in accordance with a preferred embodiment of the present invention. The apparatus for optical alignment preferably comprises a laser 10, such as a He-Ne or a diode laser, mounted at a reference location 12, and being operative to provide an output beam along a reference axis 14.

An object 16 sought to be aligned with at least one of the reference location 12 and the reference axis 14 is provided with a reflector 18, which is fixed to the object and which is operative to reflect the output beam along a reflected pathway 20.

Preferably, although not necessarily in all applications, an optical filter 22 is provided to filter out all light except light reflected from laser 10. The light reflected from reflector 18 impinges on a surface speckle generator 24, such as a light scatterer in the form of ground glass or the like. The speckle pattern produced by generator 24 is detected through filter 22 by a detector 26, such as a CCD detector array. Preferably, the CCD detector is arranged to provide detection along two dimensions.

In accordance with a preferred embodiment of the present invention, the laser 10, the speckle generator 24 and the detector 26 are fixedly mounted with respect to each other and with respect to the reference location 12.

Figure 2:
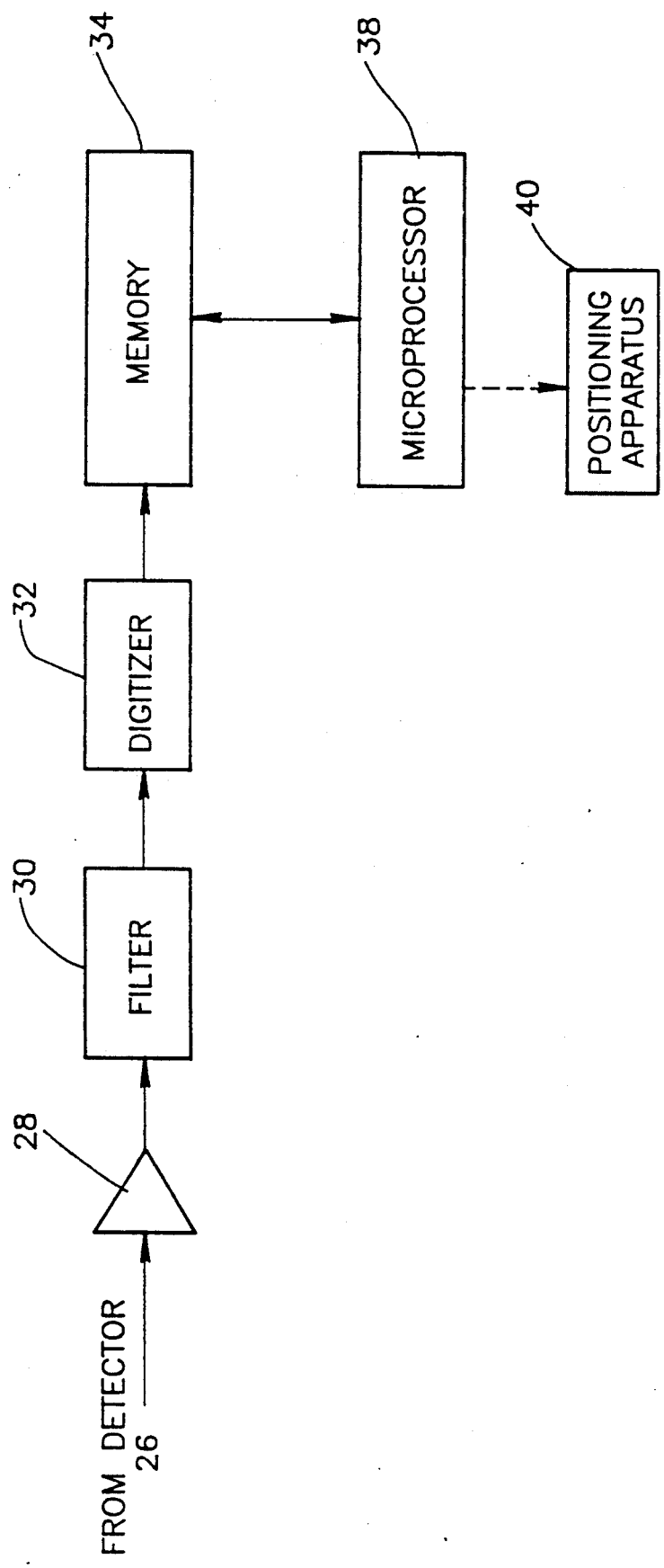
FIG. 2 is a simplified block diagram illustration of electronic circuitry useful in the invention.

Reference is now made to FIG. 2, which illustrates downstream circuitry and apparatus useful in conjunction with the apparatus of FIG. 1. The output of CCD detector 26 is typically supplied via an amplifier 28 and a filter 30 to a digitizer 32, which provides a digital output representative of the detected speckle pattern to a frame memory 34. The frame memory 34 typically stores a reference speckle pattern and then receives additional speckle patterns, which are to be compared with the reference pattern. The reference pattern is a speckle pattern typically produced when reference location 12 is aligned with an object 16. It will be appreciated that speckle patterns appear as patterns of random dots but contain in them alignment and orientation information. Thus, the speckle pattern produced from an orientation other than that of the reference orientation is significantly different from the reference pattern and the difference can be measured by the technique described hereinbelow.

Filter 30, digitizer 32 and frame memory 34 are typically of the series 150 and 151 products manufactured by Imaging Technology Inc. of Woburn, Mass. of the U.S.A.

A microprocessor or other controller 38 interacts with frame memory 34 to provide output indications of alignment or misalignment in accordance with differences between the reference speckle pattern and subsequently received speckle patterns.

In accordance with one embodiment of the invention, the output indications of alignment or misalignment may be used for controlling the positioning of the object. In this embodiment, an output indication from microprocessor 38 to positioning apparatus 40, which may be any suitable positioning apparatus for orienting or positioning object 16, such as a stepping motor and stepping motor controller. An example stepping motor and controller is the Slo-Syn series by Superior Electric Co. of Bristol, Conn. of the U.S.A.

Figure 3:
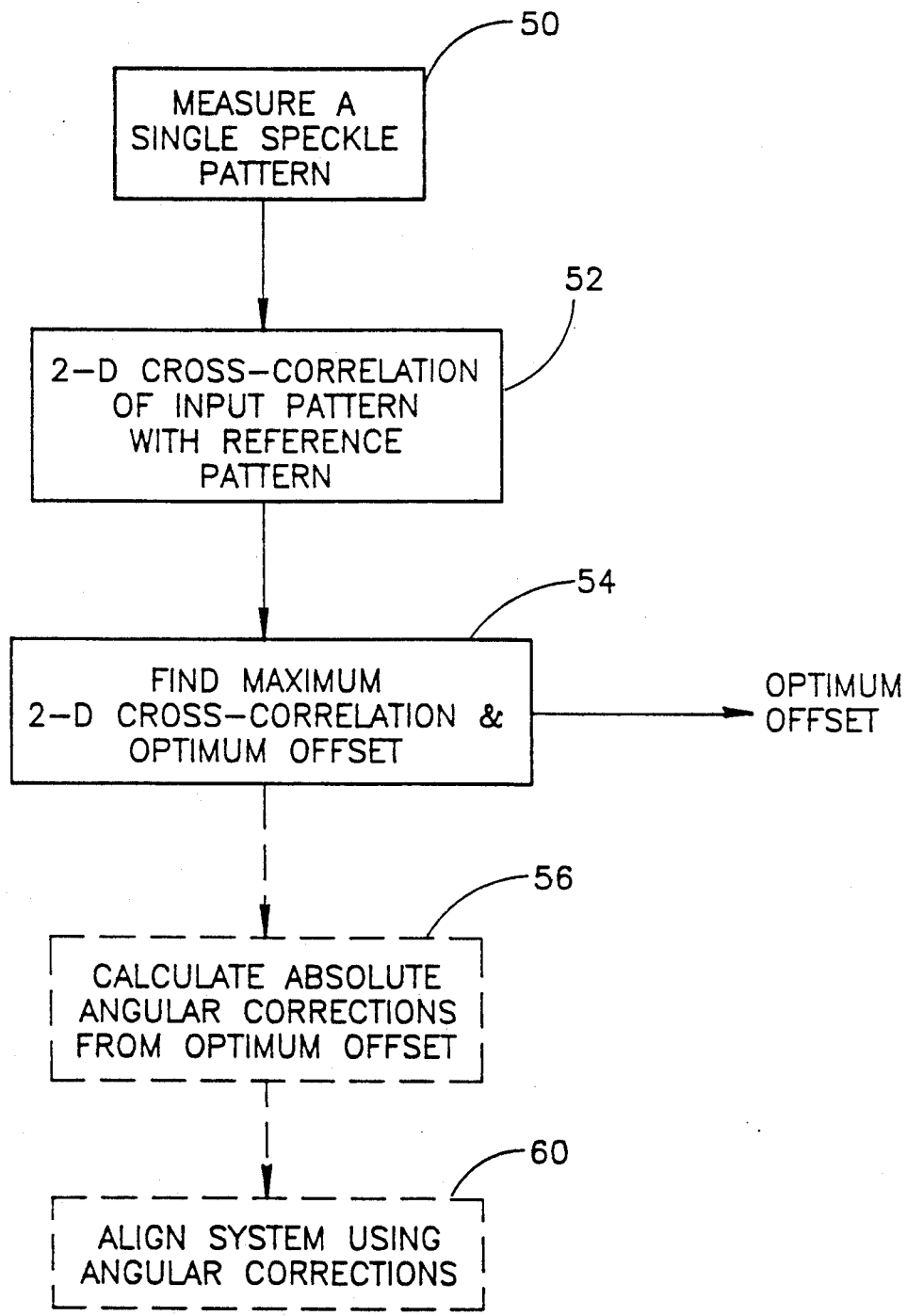
FIG. 3 is a flow chart illustration of operations useful in operating the apparatus of the present invention.

Reference is now made to FIG. 3 which illustrates, in flow chart format, the operation of the apparatus of the present invention. In step 50, digitizer 32 measures the received speckle pattern and stores it in frame memory 34.

In step 52 microprocessor 38 performs a two-dimensional cross-correlation between the received speckle pattern and the stored reference pattern. The two-dimensional cross-correlation function is described on page 69 of *Digital Image Processing*, by R. C. Gonzalez and P. Wintz, published by Addison-Wesley Publishing Company, Reading, Mass. The page numbering comes from the first edition, sixth printing, published in 1983.

The cross-correlation function is calculated by progressively moving the reference pattern over the speckle pattern. Initially, the reference pattern is laid over the measured speckle pattern, such that the central pixels of the reference pattern are laid over the central pixels of the measured speckle pattern, and the value of the cross-correlation is calculated and stored. The reference pattern is then shifted across the measured speckle pattern from this initial location to a new one, typically 1 pixel away in either the horizontal or vertical direction, and a new cross-correlation value is calculated and stored. In this manner, a cross-correlation function, which is a function of the location of the reference pattern on the measured speckle pattern, is calculated. As is known, the value of the cross-correlation will be close to 1 for two patterns which closely match each other and close to 0 for two patterns which do not match each other.

In step 54, a search through the stored cross-correlation values for the maximum value of the cross-correlation function is performed and the maximum value found. It will be recognized that other methods for finding the maximum value of the cross-correlation can be utilized. It is possible to use the Minimax method where the cross-correlation function is the function to be maximized. The Minimax method is discussed on pages 116–120 of *Artificial Intelligence* by Patrick Henry Winston, published by Addison-Wesley Publishing Company, 1984. For this embodiment, steps 52 and 54 are combined into a single step.

The location at which the maximum cross-correlation occurred is the optimum offset between the reference orientation, as stored in the reference speckle pattern, and the measured one, as stored in the measured speckle pattern. In one embodiment of the present invention, the optimum offset is output as an indication of alignment or misalignment. In accordance with a second embodiment of the present invention, the optimum offset is used to realign the apparatus, as described hereinbelow. The additional steps necessary for the second embodiment are marked on FIG. 3 with dashed lines.

Preparatory to apparatus operation, the amount of rotation and translation needed for a known shift, typically of 1 pixel, between the reference pattern and a measured pattern is calibrated and the calibration information is stored in microprocessor 38. The calibration is performed by first aligning the reference location 12 with some object 16 and recording a reference speckle pattern. The apparatus is then moved by a known amount, typically a few millimeters, and a second speckle pattern is recorded. The degree of the resultant offset is calculated, typically in pixels, and the calibration between the size of the offset and the amount of movement of the apparatus is calculated and recorded.

In step 56 the absolute angular corrections are calculated from the optimum offset calculated in step 54 and from the calibration information.

In step 60 the angular corrections are transmitted to positioning apparatus 40 which realigns the alignment apparatus. It will be appreciated that the present invention directly corrects for any misalignment in the apparatus.

It will be appreciated by persons skilled in the art that the present invention is not limited by what has been particularly shown and described hereinabove. Rather the scope of the present invention is defined only by the claims which follow.

We claim:

1. Alignment apparatus comprising:
   a source of coherent radiation mounted at a reference location and arranged to provide an output beam extending along a reference axis;
   a laser light reflector mounted at a location sought to be aligned with respect to at least one of the reference location and the reference axis;
   a laser light scatterer arranged to receive reflected laser light from the reflector and to produce a speckle pattern; and
   a detector arranged to sense the speckle pattern produced by the laser light scatterer in response to incident reflected laser light, whereby variations in the speckle pattern indicate changes in relative orientation between the reference location and the laser light reflector.

2. Apparatus according to claim 1 and wherein the laser light source, the laser light scatterer and the detector are fixedly mounted with respect to each other and with respect to the reference location.

3. Apparatus according to claim 1 and also comprising a digitizer and digital memory means for storing a reference speckle pattern.

4. Apparatus according to claim 2 and also comprising a digitizer and digital memory means for storing a reference speckle pattern.

5. Apparatus according to claim 1 and also comprising means for comparing a reference speckle pattern with subsequently acquired speckle patterns for determining alignment.

6. Apparatus according to claim 2 and also comprising means for comparing a reference speckle pattern with subsequently acquired speckle patterns for determining alignment.

7. Apparatus according to claim 3 and also comprising means for comparing a reference speckle pattern with subsequently acquired speckle patterns for determining alignment.

8. Apparatus according to claim 4 and also comprising means for comparing a reference speckle pattern with subsequently acquired speckle patterns for determining alignment.

9. Apparatus according to claim 1 and also comprising means for providing positioning of the location sought to be aligned in response to variations in the sensed speckle pattern.

10. Apparatus according to claim 2 and also comprising means for providing positioning of the location sought to be aligned in response to variations in the sensed speckle pattern.

11. Apparatus according to claim 3 and also comprising means for providing positioning of the location sought to be aligned in response to variations in the sensed speckle pattern.

12. Apparatus according to claim 4 and also comprising means for providing positioning of the location sought to be aligned in response to variations in the sensed speckle pattern.

13. Apparatus according to claim 5 and also comprising means for providing positioning of the location sought to be aligned in response to variations in the sensed speckle pattern.

14. Apparatus according to claim 6 and also comprising means for providing positioning of the location sought to be aligned in response to variations in the sensed speckle pattern.

15. Apparatus according to claim 7 and also comprising means for providing positioning of the location sought to be aligned in response to variations in the sensed speckle pattern.

16. Apparatus according to claim 8 and also comprising means for providing positioning of the location sought to be aligned in response to variations in the sensed speckle pattern.

17. An alignment technique comprising the steps of:

providing a source of coherent radiation mounted at a reference location to produce an output beam extending along a reference axis;

providing a laser light reflector mounted at a location sought to be aligned with respect to at least one of the reference location and the reference axis;

providing a laser light scatterer and arranging it to receive reflected laser light from the reflector and to produce a speckle pattern; and detecting the speckle pattern produced by the laser light scatterer in response to incident reflected laser light, whereby variations in the speckle pattern indicate changes in relative orientation between the reference location and the laser light reflector.

18. A technique according to claim 17 and also comprising the steps of digitizing a reference speckle pattern and storing it in a digital memory.

19. A technique according to claim 17 and also comprising the step of comparing a reference speckle pattern with subsequently acquired speckle patterns for determining alignment.

20. A technique according to claim 18 and also comprising the step of comparing a reference speckle pattern with subsequently acquired speckle patterns for determining alignment.

21. A technique according to claim 19 and wherein said step of comparing includes the step of two-dimensionally cross-correlating said reference speckle pattern with at least one subsequently acquired speckle pattern.

22. A technique according to claim 20 and wherein said step of comparing includes the step of two-dimensionally cross-correlating said reference speckle pattern with at least one subsequently acquired speckle pattern.

23. A technique according to claim 17 and also comprising the step of providing positioning of the location sought to be aligned in response to variations in the sensed speckle pattern.

24. A technique according to claim 18 and also comprising the step of providing positioning of the location sought to be aligned in response to variations in the sensed speckle pattern.

25. A technique according to claim 19 and also comprising the step of providing positioning of the location sought to be aligned in response to variations in the sensed speckle pattern.

26. A technique according to claim 20 and also comprising the step of providing positioning of the location sought to be aligned in response to variations in the sensed speckle pattern.

27. A technique according to claim 21 and also comprising the step of providing positioning of the location sought to be aligned in response to variations in the sensed speckle pattern.

28. A technique according to claim 22 and also comprising the step of providing positioning of the location sought to be aligned in response to variations in the sensed speckle pattern.

* * * * *